(12) United States Patent
Mhd et al.

(10) Patent No.: US 11,738,445 B2
(45) Date of Patent: Aug. 29, 2023

(54) REMOTE CONTROL SYSTEM

(71) Applicant: JAPAN SCIENCE AND TECHNOLOGY AGENCY, Kawaguchi (JP)

(72) Inventors: Yamen Saraiji Mhd, Yokohama (JP); Tomoya Sasaki, Tokyo (JP); Reo Matsumura, Tokyo (JP); Kouta Minamizawa, Yokohama (JP); Masahiko Inami, Tokyo (JP)

(73) Assignee: JAPAN SCIENCE AND TECHNOLOGY AGENCY, Kawaguchi (JP)

( * ) Notice: Subject to any disclaimer, the term of this patent is extended or adjusted under 35 U.S.C. 154(b) by 410 days.

(21) Appl. No.: 17/137,116

(22) Filed: Dec. 29, 2020

(65) Prior Publication Data

US 2021/0114199 A1  Apr. 22, 2021

Related U.S. Application Data

(63) Continuation of application No. PCT/JP2019/025781, filed on Jun. 28, 2019.

(30) Foreign Application Priority Data

Jun. 29, 2018 (JP) .................. 2018-124364

(51) Int. Cl.
*B25J 3/04* (2006.01)
*B25J 9/00* (2006.01)
(Continued)

(52) U.S. Cl.
CPC .............. *B25J 3/04* (2013.01); *B25J 9/0006* (2013.01); *B25J 9/0084* (2013.01); *B25J 9/163* (2013.01); *B25J 9/1689* (2013.01); *B25J 13/088* (2013.01)

(58) Field of Classification Search
CPC . B25J 3/04; B25J 9/0006; B25J 9/0084; B25J 9/163; B25J 9/1689; B25J 13/088; B25J 13/025; G05B 19/042
(Continued)

(56) References Cited

U.S. PATENT DOCUMENTS 5,631,973 A * 5/1997 Green .................. B25J 9/1689
382/128
6,659,939 B2 * 12/2003 Moll ...................... A61B 34/30
600/102
(Continued)

FOREIGN PATENT DOCUMENTS

| JP | H-08248870 A | 9/1996 |
| JP | 2005-515012 A | 5/2005 |
| WO | WO-03/061482 A1 | 7/2003 |

OTHER PUBLICATIONS

Stanczyk, B., "Development and Control of an Anthropomorphic Telerobotic System", 2006, journal="Ph.D. Thesis, Technische Universitat Munchen, Institute for Automatic Control Engineering", URL=https://cir.nii.ac.jp/crid/1572543026130771072, pp. 1-113 (Year: 2006).*

(Continued)

*Primary Examiner* — Jaime Figueroa
(74) *Attorney, Agent, or Firm* — Muncy, Geissler, Olds & Lowe, P.C.

(57) ABSTRACT

A remote control system including a robot arm, an imaging apparatus, a base part, and a remote controller for remotely controlling the robot arm. The robot arm is fitted to the base part. The imaging apparatus is fitted to the base part and provided near a head of a wearer. The base part is fitted to an upper half of a body of the wearer, the upper half of the body being exemplified by a back. The robot arm and the imaging apparatus are communicably connected to the (Continued)

remote controller. The controller controls the robot arm based on an image received from the imaging apparatus.

11 Claims, 10 Drawing Sheets

(51) Int. Cl.
*B25J 9/16* (2006.01)
*B25J 13/08* (2006.01)

(58) Field of Classification Search
USPC .............. 700/245–264; 318/568.11–568.25
See application file for complete search history.

(56) References Cited

U.S. PATENT DOCUMENTS

| | | | | |
|---|---|---|---|---|
| 6,837,883 | B2* | 1/2005 | Moll | G16H 40/63 606/1 |
| 6,850,222 | B1* | 2/2005 | Rosenberg | G09B 23/28 345/157 |
| 6,963,792 | B1* | 11/2005 | Green | A61B 34/37 348/E13.016 |
| 7,409,882 | B2* | 8/2008 | Massimo | G06F 3/016 73/865.4 |
| 7,410,338 | B2* | 8/2008 | Schiele | A63B 23/1263 414/4 |
| 7,865,266 | B2* | 1/2011 | Moll | G16H 20/40 901/6 |
| 7,949,616 | B2* | 5/2011 | Levy | H04N 7/185 706/11 |
| 9,314,922 | B2* | 4/2016 | Dockter | B25J 9/1689 |
| 9,427,864 | B2* | 8/2016 | Kornbluh | B25J 9/1615 |
| 9,573,276 | B2* | 2/2017 | Stephens, Jr. | B64G 4/00 |
| 9,588,582 | B2* | 3/2017 | Connor | A61B 5/1126 |
| 9,652,037 | B2* | 5/2017 | Rubin | A63F 13/21 |
| 9,904,358 | B2* | 2/2018 | Rubin | A63F 13/98 |
| 9,950,422 | B2* | 4/2018 | Kornbluh | B25J 9/1633 |
| 10,105,839 | B2* | 10/2018 | Kornbluh | B25J 9/1633 |
| 10,222,859 | B2* | 3/2019 | Rubin | A63F 13/212 |
| 10,285,765 | B2* | 5/2019 | Sachs | B25J 9/108 |
| 10,357,881 | B2* | 7/2019 | Faridi | G10L 15/32 |
| 11,148,296 | B2* | 10/2021 | Breazeal | G10L 15/22 |
| 11,576,742 | B2* | 2/2023 | Tucker | A61B 34/74 |
| 2005/0267826 | A1 | 12/2005 | Levy et al. | |
| 2008/0009771 | A1* | 1/2008 | Perry | A61H 1/0281 600/587 |
| 2012/0179075 | A1* | 7/2012 | Perry | B25J 9/0006 601/33 |
| 2013/0211587 | A1* | 8/2013 | Stephens, Jr. | B25J 3/04 901/1 |
| 2013/0211594 | A1* | 8/2013 | Stephens, Jr. | G06N 3/008 700/258 |
| 2014/0031983 | A1* | 1/2014 | Low | B25J 9/0087 700/259 |
| 2015/0075303 | A1* | 3/2015 | Connor | A41D 13/1281 73/865.4 |
| 2015/0266180 | A1* | 9/2015 | Kornbluh | F16D 28/00 700/260 |
| 2015/0314454 | A1* | 11/2015 | Breazeal | G10L 15/32 700/259 |
| 2016/0151917 | A1* | 6/2016 | Faridi | B25J 11/0015 700/259 |
| 2017/0181916 | A1* | 6/2017 | Klassen | B25J 9/0006 |
| 2017/0281385 | A1* | 10/2017 | Angold | A61F 5/0102 |
| 2017/0291299 | A1* | 10/2017 | Mullen | B25J 13/025 |
| 2019/0176320 | A1* | 6/2019 | Smith | B25J 19/0004 |
| 2019/0183715 | A1* | 6/2019 | Kapure | G16H 50/20 |
| 2020/0009719 | A1* | 1/2020 | Scattareggia Marchese | A61F 2/74 |
| 2021/0094180 | A1* | 4/2021 | Szafir | B25J 13/00 |

OTHER PUBLICATIONS

S. Fani et al., "Simplifying Telerobotics: Wearability and Teleimpedance Improves Human-Robot Interactions in Teleoperation," in IEEE Robotics & Automation Magazine, vol. 25, No. 1, pp. 77-88, Mar. 2018, doi: 10.1109/MRA.2017.2741579. (Year: 2018).*
André Schiele, et al., The ESA Human Arm Exoskeleton for Space Robotics Telepresence, 2003, ResearchGate, in proceedings of 7th international Symposium on Artificial Intelligence, Robotics and Automation in Space, iSAIRAS, 2003, Nara, Japan; DOI: 10.13140/RG.2.2.10069.27362 (Year: 2003).*
U. Martinez-Hernandez, L. W. Boorman and T. J. Prescott, "Multisensory Wearable Interface for Immersion and Telepresence in Robotics," in IEEE Sensors Journal, vol. 17, No. 8, pp. 2534-2541, Apr. 15, 2017, doi: 10.1109/JSEN.2017.2669038. (Year: 2017 ).*
Maeda and H. Ando, "Wearable robotics as a behavioral interface— the study of the Parasitic Humanoid," Proceedings. Sixth International Symposium on Wearable Computers,, Seattle, WA, USA, 2002, pp. 145-151, doi: 10.1109/ISWC.2002.1167236. (Year: 2002).*
Tachi, S., Telecommunication, Teleimmersion and Telexistence II, New IOS Press Publication, Jun. 2005, 2 pages.
Saraiji et al., "Fusion Full Body Surrogacy for Collaborative Communication," Sigggraph'18 Emerging Technologies, Aug. 12, 2018, 3 Fusion Overview, 2 pages.
Saraiji et al., "Metalimbs 2.0: Exploring Telepresence," Jun. 12, 2018, url:htps://blogs.siggraph.org/2018/06/operators-and-surrogates-exploring-telepresence.html; 4 pages.
Saraiji et al., "Beyond Presence—A Telexistence Toolkit for Augmenting Body and Re-engineering Presence," Dec. 15, 2018, vol. 36, No. 10, 6 pages.
Sasaki et al., "MetaLimbs: Metamorphosis for Multiple Arms Interaction using Artificial Limbs," Siggraph '17 Posters, Jul. 30, 2017, 2 pages.
International Preliminary Report on Patentability dated Dec. 29, 2020 in PCT/JP2019/025781, 9 pages.
International Search Report dated Sep. 10, 2019 in PCT/JP2019/025781, 4 pages.

* cited by examiner

1

REMOTE CONTROL SYSTEM

BACKGROUND OF THE INVENTION

1. Field of the Invention

The present invention relates to a remote control system.

2. Description of the Related Art

One of the technologies for controlling a remote robot as if it is at hand for the operator is telexistence (see, for example, non-patent literature 1).

"Telecommunication, Teleimmersion and Telexistence II" Susumu Tachi, Ohmsha, IOSPress, ISBN4-274-90638-8 (Ohmsha) ISBN1-58603-519-3

Telexistence is a technology to control and manipulate, based on information from a sensor, etc. of a remote robot (referred to as "surrogate"), the surrogate. Telexistence allows the operator to feel as if the operator "possesses" the surrogate and control it. Thus, the operator can control a thing at a remote location, feeling as if the thing is close by the operator.

In the related-art telexistence, however, the surrogate is a robot and not a human being and does not allow human beings to be in physical communication or share the sense.

SUMMARY OF THE INVENTION

The present invention addresses the above-described issue, and an illustrative purpose thereof is to provide a technology of allowing human beings at remote locations to be in physical communication, feeling as if they share one body.

A remote control system according to an embodiment of the present invention includes: a robot arm, an imaging apparatus, a base part, and a remote controller for remotely controlling the robot arm. The robot arm is fitted to the base part. The imaging apparatus is fitted to the base and provided near a head of a wearer. The base part is fitted to a upper half of a body of the wearer, the upper half of the body being exemplified by a back. The robot arm and the imaging apparatus are communicably connected to the remote controller. The remote controller controls the robot arm based on an image received from the imaging apparatus.

Optional combinations of the aforementioned constituting elements, and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

First Embodiment

Figure 1:
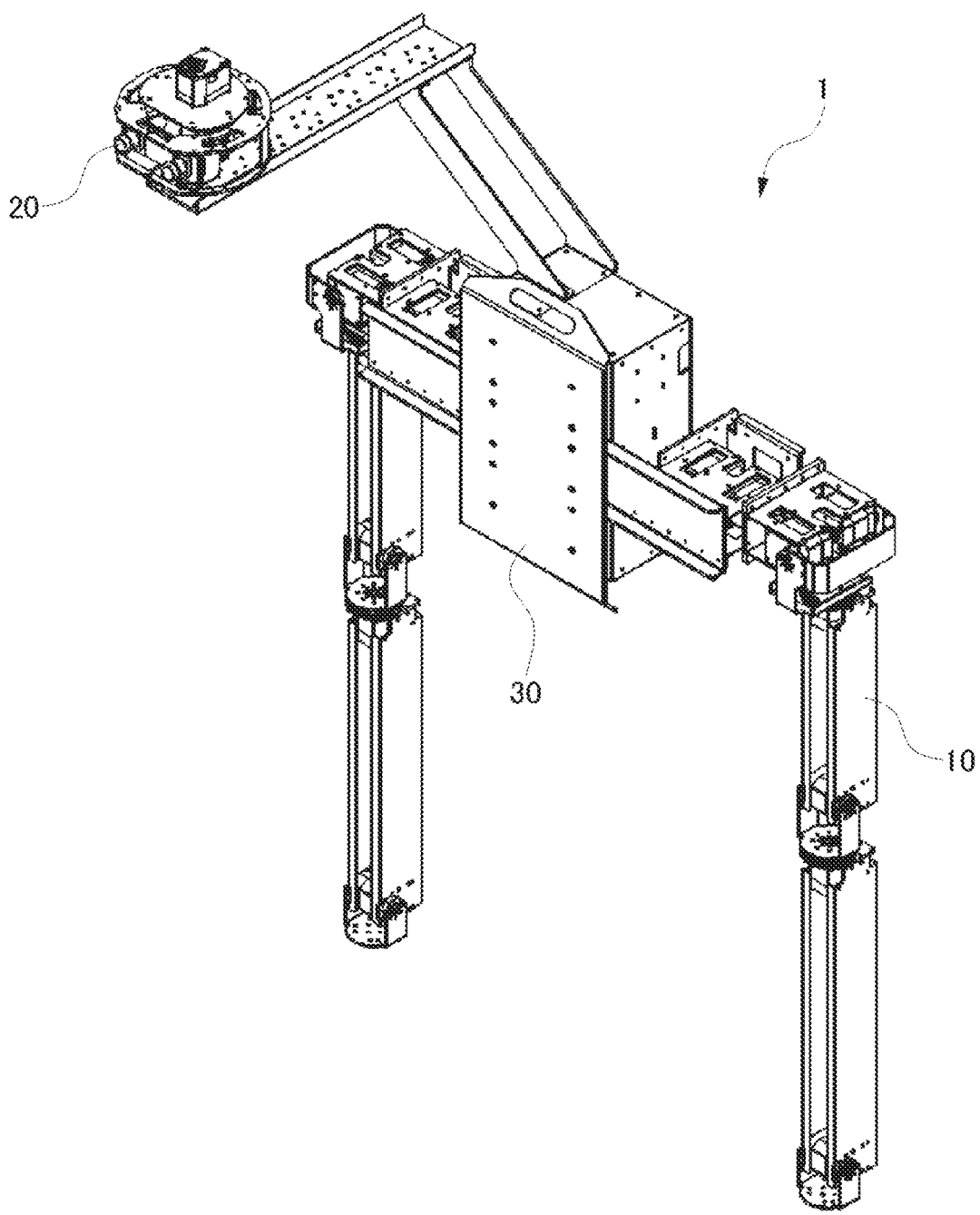
FIG. 1 is a schematic diagram showing a remote control system 1 according to the first embodiment.

FIG. 1 is a schematic diagram showing a remote control system 1 according to an embodiment. The remote control system 1 is provided with a robot arm 10, an imaging apparatus 20, a base part 30, and a remote controller (70 in FIG. 4) for remotely controlling the robot arm 10. The robot arm 10 is fitted to the bae part 30. The base part 30 is worn on the upper half of the body (e.g., the back) of a person wearing the base part 30 (hereinafter, "wearer"). The imaging apparatus 20 is fitted to the base part 30 and provided near the head of the wearer. The robot arm 10 and the imaging apparatus 20 are communicably connected to the remote controller 70.

The imaging apparatus 20 is exemplified by a video camera taking images such as moving images. Since the imaging apparatus 20 is provided near the head of the wearer, the image taken by the imaging apparatus 20 is substantially the same as the scene viewed by the wearer. In this sense, the imaging apparatus 20 shares a viewpoint with the wearer. The imaging apparatus 20 transmits the taken image to the remote controller 70.

In order to take substantially the same scene as viewed by the wearer, the imaging apparatus 20 may be provided to face a space in front of the wearer.

The remote controller 70 is provided with an image receiver, a display unit, controllers (720a, 720b of FIG. 4), and a control signal transmitter (not shown).

The image receiver receives an image taken by the imaging apparatus 20. The display unit displays the image received by the imaging apparatus 20 to a person manipulating the remote controller 70 (hereinafter, "manipulator"). The manipulator moves the controllers 720a, 720b to control the robot arm 10 while seeing the image on the side of the wearer displayed on the display unit. This causes the controllers 720a, 720b to generate a control signal that defines the action of the robot arm 10. The control signal transmitter transmits the control signal generated by the controllers 720a, 720b to the robot arm 10.

Figure 4:
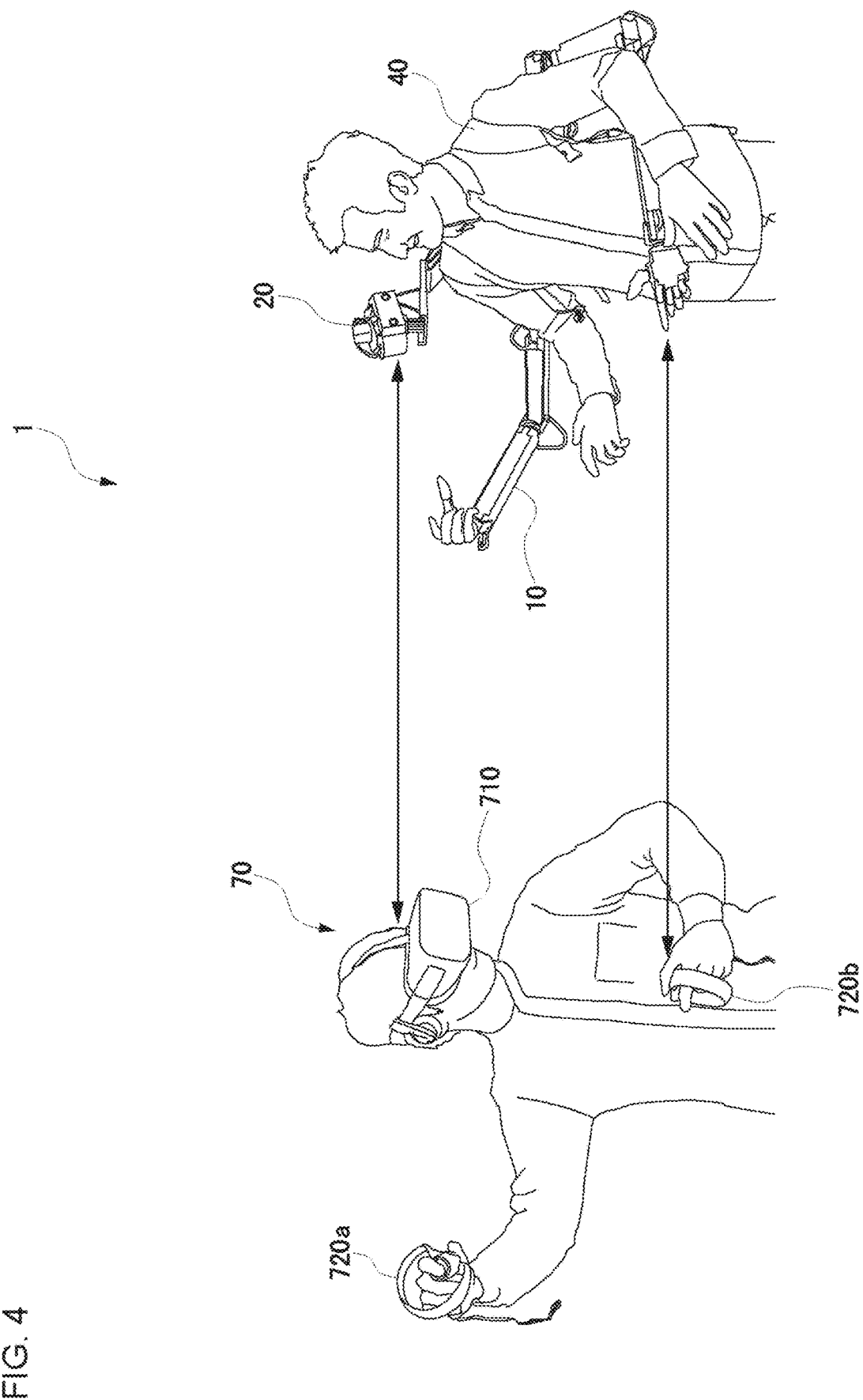
FIG. 4 shows a usage scene of the remote control system according to an embodiment.

The image receiver and the display unit may be integrated as a head-mounted display 710 as shown in FIG. 4 or may be separate members. The embodiment is non-limiting as to the type of the display unit. A desired, suitable display apparatus such as a liquid crystal display and a video projector may be used. As shown in FIG. 4, the controllers may be motion controllers held by the right and left hands of the manipulator. The embodiment is non-limiting as to the type of the controller. A desired, suitable controller such as a joystick and a game pad may be used.

The robot arm 10 is moved in accordance with the control signal received from the remote controller 70. The robot arm 10 may or may not be fitted to the body (e.g., the arm) of the wearer. Since the robot arm 10 is fitted to the base part 30 worn on the upper half of the body (e.g., the back) of the wearer, the robot arm 10 is moved to act upon the body of the wearer from behind the wearer.

Figure 2:
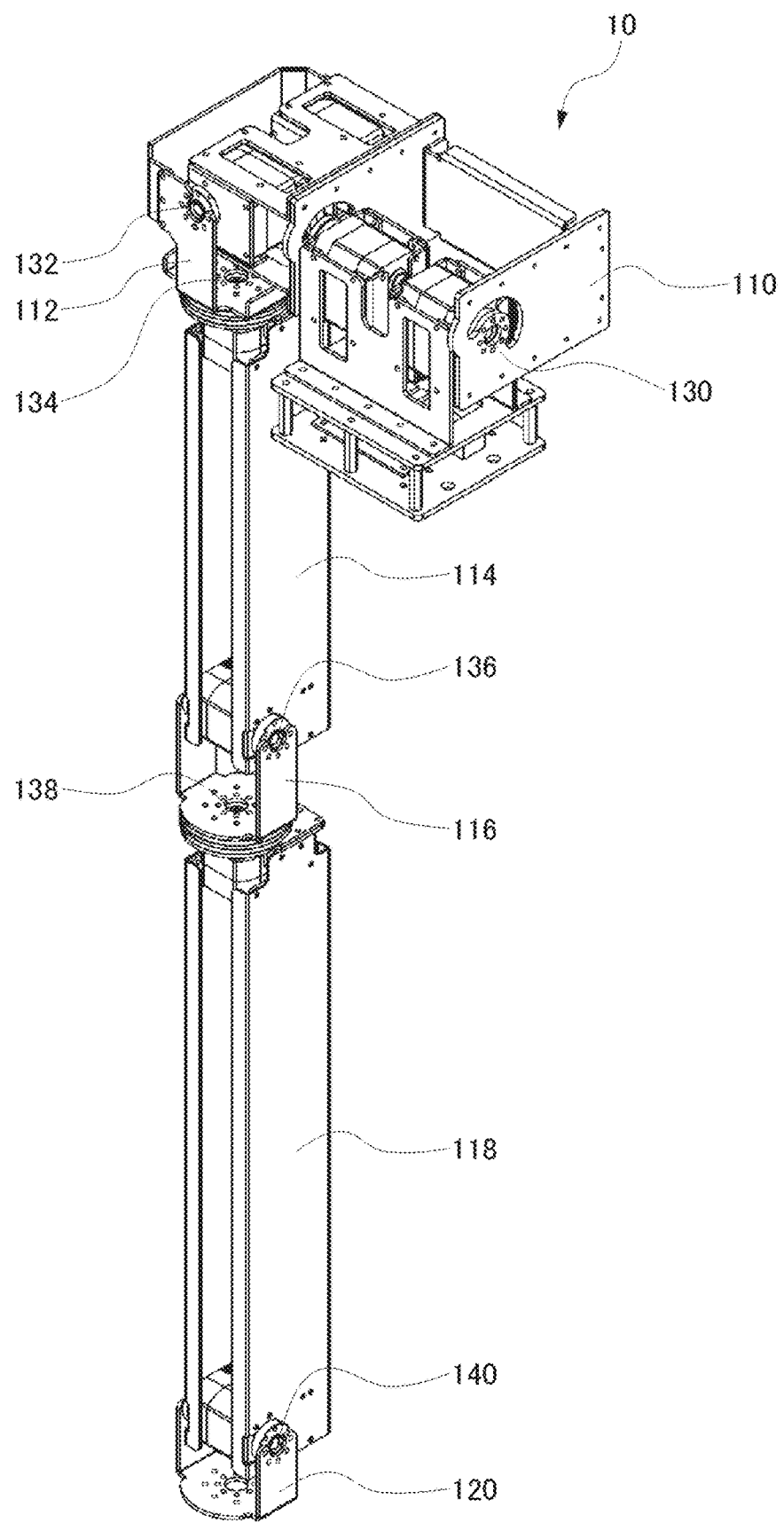
FIG. 2 is a schematic diagram showing the robot arm of the remote control system of FIG. 1.

FIG. 2 is a schematic diagram showing the robot arm 10 of the remote control system 1 of FIG. 1. The robot arm 10 is provided with a shoulder part 110, a shoulder joint 112, an upper arm part 114, an elbow joint 116, a forearm part 118, and a wrist part 120.

The shoulder joint 112 can rotate independently around shafts 130, 132, and 134 by a motor. The elbow joint 116 can rotate independently around shafts 136 and 138 by a motor. The wrist part 120 can rotate independently around a shaft 140 by a motor.

Reference is made back to FIG. 1. The base part 30 is connected to the robot arm 10 and the imaging apparatus 20 and supports them. The base part 30 is worn on the upper half of the body (e.g., the back) of the wearer. For example, the base part 30 is carried on the back. The base part 30 may be provided with a harness such as a carrying belt (40 of FIG. 3) to make it easy for the wearer to wear the base part 30. A battery for supplying power to the robot arm 10 and the imaging apparatus 20 may be provided inside the base part 30. A controlling apparatus for receiving the control signal from the remote controller 70 and controlling the movement of the robot arm 10 and the imaging apparatus 20 may be provided inside the base part 30.

Figure 3:
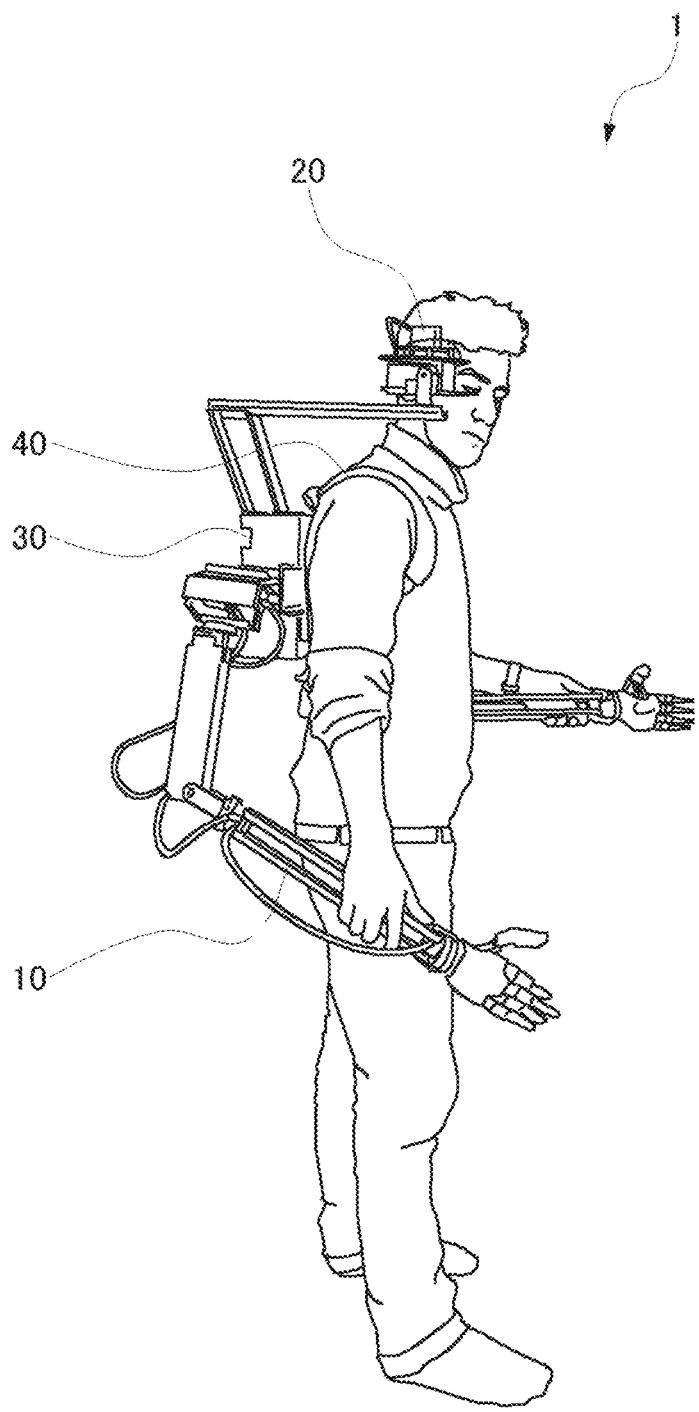
FIG. 3 shows how the wearer wears the remote control system of FIG. 1.

FIG. 3 shows how the wearer wears the remote control system 1 of FIG. 1. The base part 30 of the remote control system 1 is carried on the back of the wearer by using the carrying belt 40.

A description will be given of a usage scene as viewed from the user (wearer and manipulator). FIG. 4 shows a usage scene of the remote control system according to an embodiment. The wearer wears the base part 30 of the remote control system 1 on the upper half of the body (e.g., the back). The manipulator wears the head-mounted display 710 on the head. The manipulator monitors the image displayed on the head-mounted display 710. As described above, the image displayed on the head-mounted display 710 is the image taken by the imaging apparatus 20 provided near the head of the wearer. Therefore, the image monitored by the manipulator is substantially the same as the scene viewed by the wearer. In other words, the manipulator shares a point of view with the wearer and feels as if the manipulator and the wearer share one body. The manipulator controls the robot arm 10 by moving the controllers 720a, 720b held by the right and left hands with the point of view of the wearer. In this way, the manipulator can access the wearer via the robot arm 10, feeling as if the manipulator and the wearer share the body. Meanwhile, the wearer can be in physical communication with the manipulator via the action of the robot arm 10.

Specific examples of physical communication mentioned above include "moving the arm of the wearer for the purpose of teaching a skill of sports, playing a musical instrument, driving, etc.", "pulling the arm of the wearer in a direction that the wearer should move", and "playing a game between the manipulator and the wearer via the robot arm".

According to the embodiment described above, the wearer and the manipulator at remote locations can be in physical communication, feeling as if they share one body via the robot arm 10.

Second Embodiment

Figure 5:
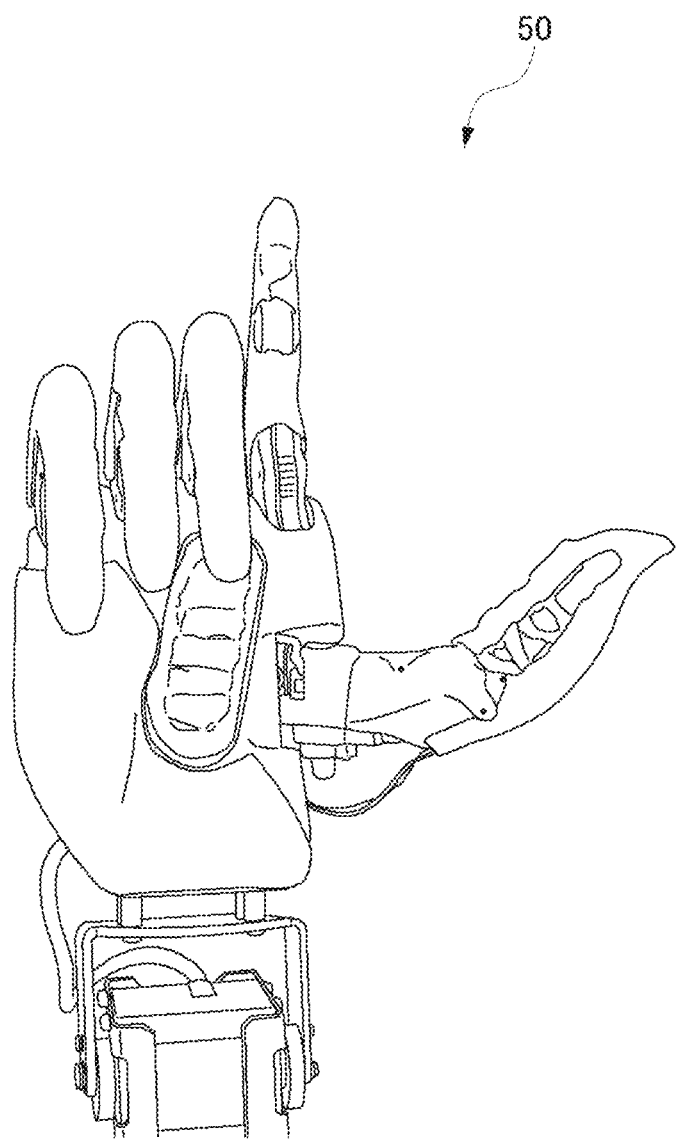
FIG. 5 shows a hand part of the remote control system according to the second embodiment.

In one embodiment, the robot arm 10 may be provided with a hand part. FIG. 5 shows a hand part 50 of the remote control system 1 according to this embodiment. The hand part 50 is removably fitted to the wrist part 120 of the robot arm 10. Each finger joint of the hand part 50 is provided with a motor, and the fingers of the hand part 50 can be bent and extended at the respective joints independently. According to the embodiment, the hand part 50 can grip the arm of the wearer, or the hand part 50 and the wearer can exchange a thing between them. Therefore, physical communication in a variety of forms is possible.

Third Embodiment

Figure 6:
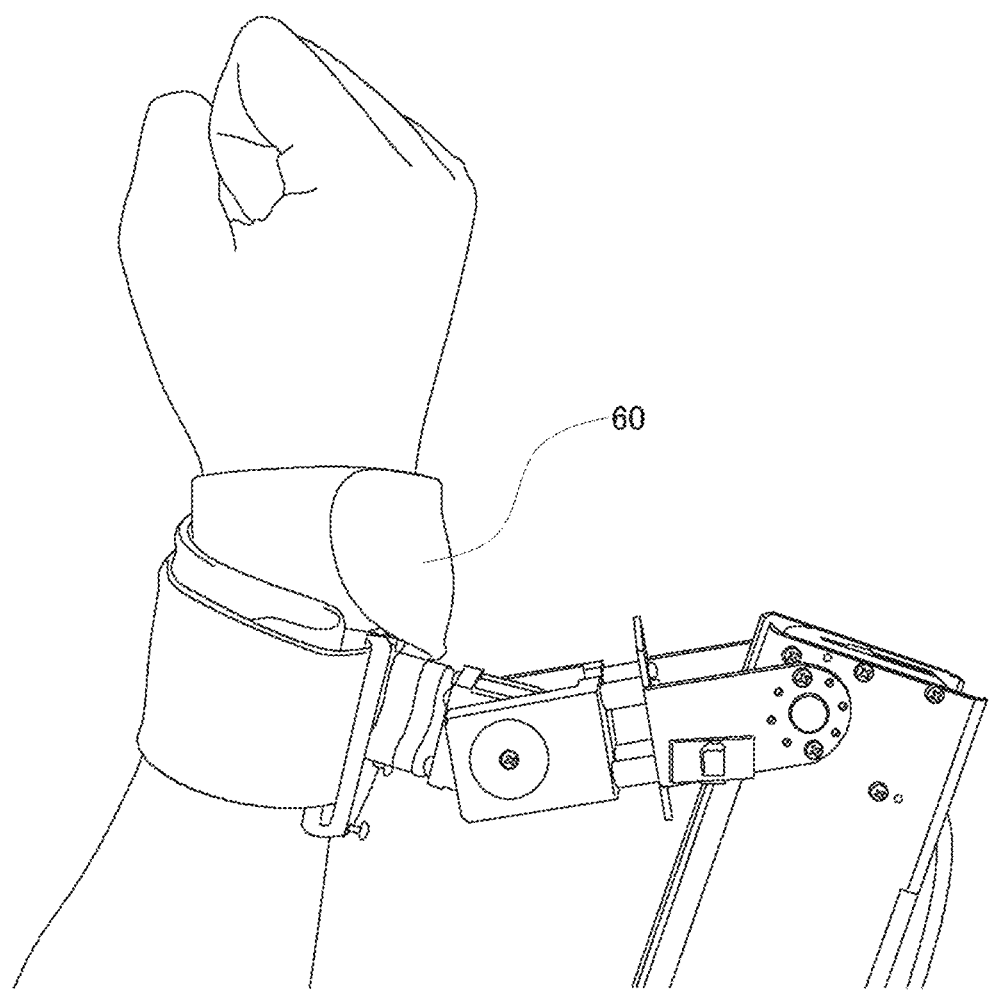
FIG. 6 shows a fixing component of the remote control system according to the third embodiment.

In one embodiment, the robot arm 10 may be provided with a fixing component for fixing the robot arm 10 to the arm part of the wearer. FIG. 6 shows a fixing component 60 of the remote control system 1 according to this embodiment. The fixing component 60 is removably fitted to the wrist part 120 of the robot arm 10. By way of one example, the fixing component 60 is a band wrapped around the wrist of the wearer to fix the robot arm 10 to the wrist of the wearer. According to this embodiment, the robot arm 10 is fixed to the arm part of the wearer so that the arm part of the wearer can be moved forcibly.

Fourth Embodiment

The total length of the robot arm 10 as extended may longer than the total length of the arm of the wearer. According to this embodiment, the robot arm 10 can pull the already-extended arm of the wearer and so can guide the wearer in a desired direction.

Fifth Embodiment

Figure 7:
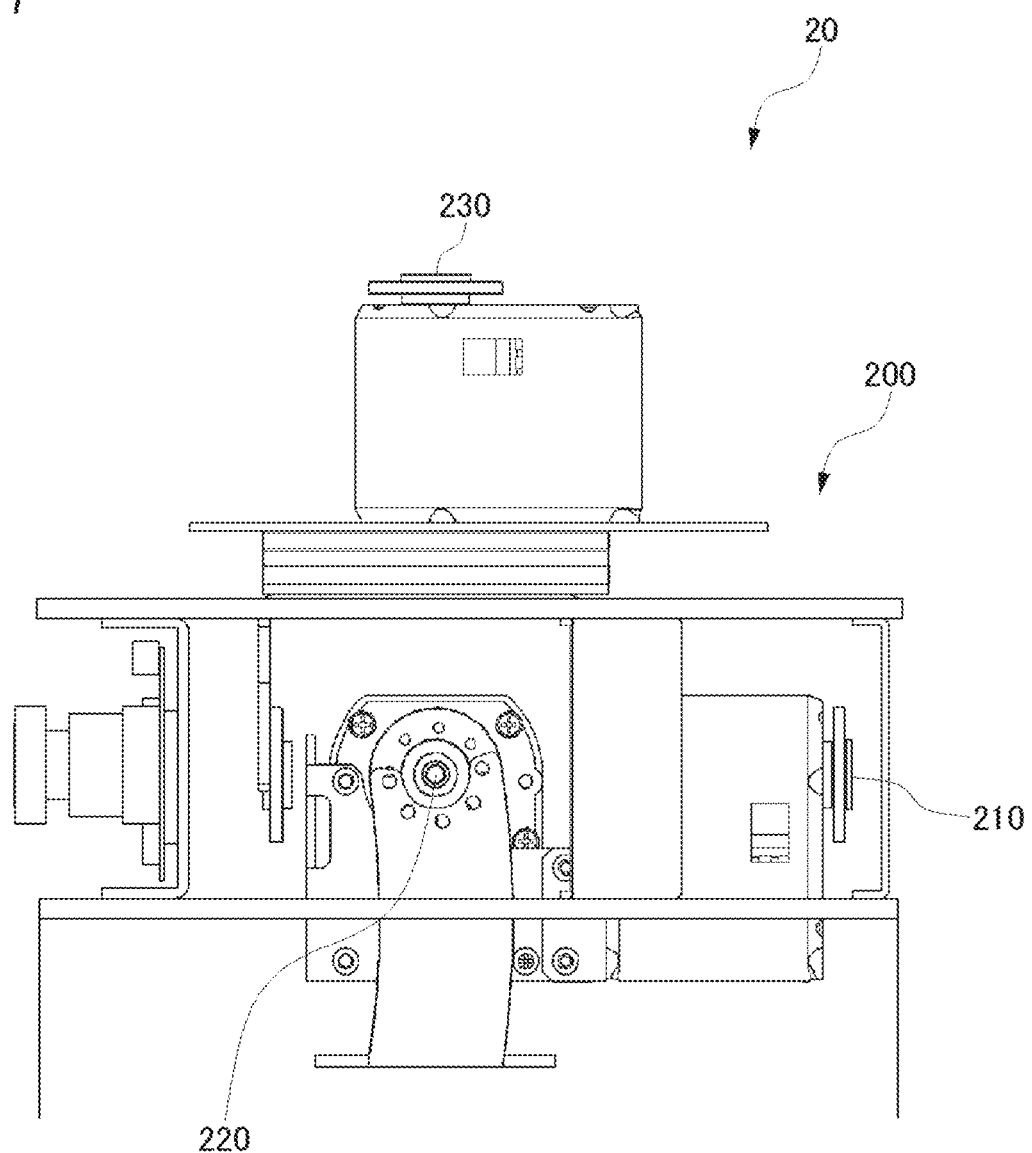
FIG. 7 is a side view of the imaging apparatus according to the fifth embodiment.

In one embodiment, the imaging apparatus 20 may be provided with a rotation mechanism for changing the direction of imaging. FIG. 7 is a side view of the imaging apparatus 20 of the remote control system 1 according to this embodiment. The imaging apparatus 20 provided with a rotation mechanism 200 is communicably connected to the remote controller 70. The rotation mechanism 200 can be driven by a motor into rotation around shafts 210, 220, 230 independently (the rotations around the shafts correspond to rolling, pitching, and yawing, respectively). The remote controller 70 remotely controls the rotation mechanism 200 to change the direction of imaging of the imaging apparatus 20. According to this embodiment, the manipulator can change the direction of imaging of the imaging apparatus 20 as desired so that more suitable visual information can be obtained than otherwise.

Sixth Embodiment

In one embodiment, the remote controller 70 may further be provided with a recorder for recording the control signal. The control signal is recorded in the recorder concurrently with being output from the remote controller 70. Further, the control signal may be transmitted to the robot arm 10 concurrently with being recorded in the recorder. In this case, a history of control signals transmitted to the robot arm 10 can be maintained in the recorder. Alternatively, the control signal may be recorded in the recorder but may not be transmitted to the robot arm 10 concurrently with being recorded. In this case, the control signal may be transmitted from the recorder to the robot arm 10 after an elapse of a predetermined period of time since the output from the remote controller 70. The embodiment is non-limiting as to the configuration of the recorder. For example, a recording medium such as a memory and a storage may be used. According to this embodiment, the control signal can be recorded so that it is possible to maintain a history of control signals or transmit the control signal with a predetermined time difference.

In particular, the remote controller 70 may transmit the control signal recorded in the recorder. In other words, the control signal is not transmitted directly from the remote controller 70 but is recorded in the recorder temporarily and then transmitted from the recorder. For example, the remote control system 1 can be applied to teaching of a skill of sports, playing a musical instrument, driving, etc. from a teacher to a student. In this case, the remote controller 70 is provided on the teacher's side and the robot arm 10 is provided on the student's side. In this case, the teacher is not necessarily on duty in a classroom when the remote control system 1 is used in the classroom. According to this embodiment, the control signal indicating the detail of teaching of the teacher can be recorded in the recorder, and the control signal can be played back and transmitted. Therefore, the student in a situation as described above can go to the classroom at a desired time and learn the skill.

Seventh Embodiment

In one embodiment, the remote controller 70 may further be provided with a machine learning unit. The machine learning unit outputs a new control signal by receiving an image and a control signal and performing machine learning. Machine learning is not limited to any particular method. For example, a neural network such as a convolutional neural network (CNN), a recurrent neural network (RNN), and a long short term memory (LSTM) network may be used. In this case, different neural networks for different calculation models may be mixed, with the input layer being in common. The machine learning unit performs machine learning by using the image taken by the imaging apparatus 20 and the control signal output by the remote controller 70 as training data and outputs a new control signal. In the case the remote control system 1 is applied to the teaching of an accurate physical movement in sports (e.g., a golf swing or a tennis shot), an optimum control signal for the student can be generated by performing machine learning using a combination of the image of an actual movement of the student and the associated control signal from the teacher as training data. When the image of an actual movement of the student is comprised of a series of continuous images such as those of a golf swing and a tennis shot, a point at which the movement abruptly changes in the images (hereinafter, "a point of abrupt change") is identified, and images from a given point of abrupt change to the next point of abrupt change may be cropped as one scene for learning. According to this embodiment, a new control signal is output by performing machine learning using the image taken on the side of the robot arm and the control signal output by the remote controller as training data. Therefore, a proper control signal can be obtained.

In particular, the remote controller 70 may transmit the control signal output by the machine learning unit based on the image signal. In this case, an optimum control signal suited to the image taken on the side of the robot arm is output from the machine learning unit and transmitted to the side of the robot arm. According to this embodiment, the student wearing the robot arm can receive an optimum control signal suited to the student's movement and so can receive an instruction for an optimum physical action.

Eighth Embodiment

In one embodiment, the remote control system 1 is provided with a plurality of robot arms 10, an equal number of imaging apparatuses 20, and an equal number of base parts 30. The remote controller 70 may transmit the same control signal to all robot arms 10 at the same time. For example, the robot arm side of the remote control system 1 is formed by n pairs each comprised of the robot arm 10, the imaging apparatus 20, and the base part 30, where n is an integer equal to or larger than 2. These pairs are worn by, for example, n wearers. Meanwhile, the remote controller side of the remote control system 1 is formed by one or a plurality of remote controllers 70. The control signal from the remote controller 70 is transmitted to the n robot arms at the same time. For example, the control signal may be transmitted to the n robot arms by using a multicast protocol. In this case, the display unit displays an image taken by one of the n imaging apparatuses 20. According to this embodiment, an action can be taught to multiple students at the same time in an application in which, for example, the remote controller 70 is provided on the side of one teacher and the robot arms 10 are provided on the side of a plurality of students to teach the action. Therefore, efficient education can be realized. This is particularly useful in cases where the same action is taught to a large number of students in factories, schools, etc.

Ninth Embodiment

In one embodiment, the remote control system 1 may be provided with a plurality of remote controllers 70, and each of the plurality of remote controllers 70 may be provided with an interruption unit capable of transmitting a control signal by interrupting while another remote controller 70 is transmitting a control signal. For example, the remote controller side of the remote control system 1 may be formed by n remote controllers 70, where n is an integer equal to or larger than 2. These n remote controllers 70 are manipulated respectively by, for example, n teachers. Meanwhile, the robot arm side of the remote control system 1 is formed by one or a plurality of pairs each comprised of the robot arm 10, the imaging apparatus 20, and the base part 30. The robot arm receives the control signal transmitted from one of the n remote controllers 70 and is activated based on the received control signal. Each of the n remote controllers 70 can transmit a control signal to control the robot arm 10. Further, each of the n remote controllers 70 can interrupt while another remote controller 70 is transmitting a control signal and transmit a control signal, by starting the interruption unit. According to this embodiment, a plurality of teachers can work together to teach an action to one student in an application in which, for example, the remote controllers 70 are provided on the side of n teachers and the robot arm 10 is provided on the side of one student to teach the action. Therefore, sophisticated and advanced education is realized. For example, this is particularly useful in cases where instructions from a plurality of teachers having expertise in the respective areas are necessary to teach an action.

Tenth Embodiment

In one embodiment, the remote control system 1 may be provided with a plurality of remote controllers 70, and the robot arm 10 may be controlled by a signal derived from averaging control signals output from the plurality of remote controllers 70. For example, the remote controller side of the remote control system 1 is formed by n remote controllers 70, where n is an integer equal to or larger than 2. Each of the n remote controllers 70 is manipulated by, for example, n teachers. Meanwhile, the robot arm side of the remote control system 1 is formed by one or a plurality of pairs each comprised of the robot arm 10, the imaging apparatus 20, and the base part 30. The control signals output from the n remote controllers 70 are collected and are averaged successively. Hereinafter, the control signal resulting from successively averaging the control signals will be referred to as "average control signal". The embodiment is non-limiting as to the method of averaging. A simple arithmetic average of the control signal values may be calculated, or a weighted average may be calculated by weighing the control signal of each teachers. In this embodiment, a plurality of receivers may be provided in the robot arm 10 to receive control signals from the plurality of remote controllers 70. The received control signals may be successively averaged on the robot arm side, and the averaged signal may be used as the control signal. Alternatively, one robot arm side receiver may be provided, and the plurality of remote controllers 70 may have a common transmitter. The control signals output from the respective remote controllers 70 may be successively averaged by the transmitter and transmitted to the robot arm side. The teacher may have a unique habit in his or her action, and it is not necessarily preferred to teach the habit directly to the student. This is addressed in a lot of cases by preparing a plurality of teachers and averaging the actions of those teachers to moderate the habit that each teacher has so as to result in an optimum action. According to this embodiment, an optimum action being removed the habit of teachers can be taught to the student.

Physical communication between the wearer and the manipulator via the robot arm can be categorized into the following three types by way of example.

(First Type of Communication) "Direct"

Figure 8:
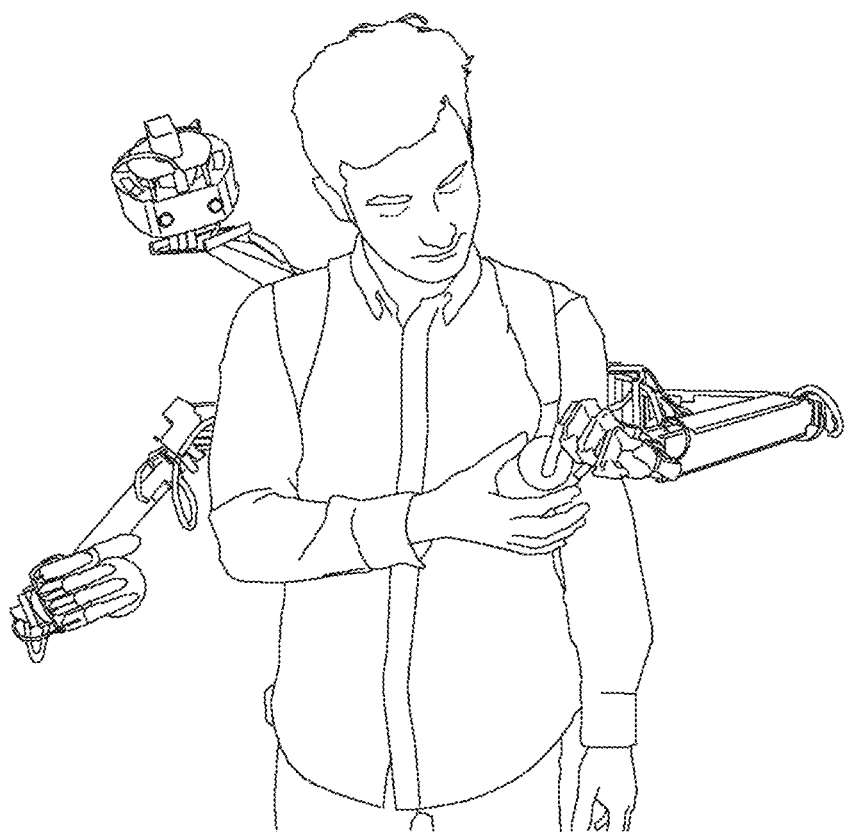
FIG. 8 shows the first type of communication.

FIG. 8 shows the first type of communication. In this type of communication, the robot arm 10 is not fitted to the body of the wearer. The robot arm 10 designates a direction to the wearer by pointing in the direction or delivers a thing between the robot arm 10 and the wearer. An example of this type of communication is when the manipulator and the wearer shake hands or pass a thing between them via the robot arm. We have named this type of communication "Direct".

(Second Type of Communication) "Enforce"

Figure 9:
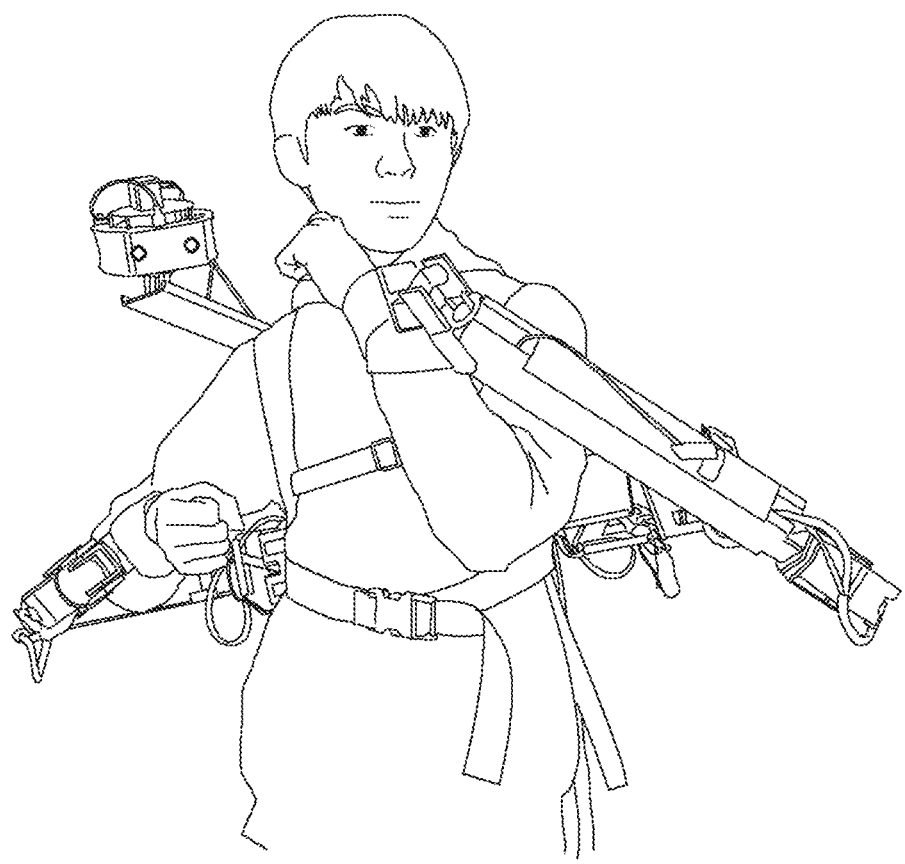
FIG. 9 shows the second type of communication.

FIG. 9 shows the second type of communication. In this type of communication, the robot arm 10 is fitted to the body (e.g., the arm) of the wearer. The robot arm 10 guides the body of the wearer to make a certain movement forcibly or guide the body of the wearer to a certain position. An example of this type of communication is when a skill of sports, playing a musical instrument, driving, etc. is taught to the wearer via the robot arm. We have named this type of communication "Enforce".

(Third Type of Communication) "Induce"

Figure 10:
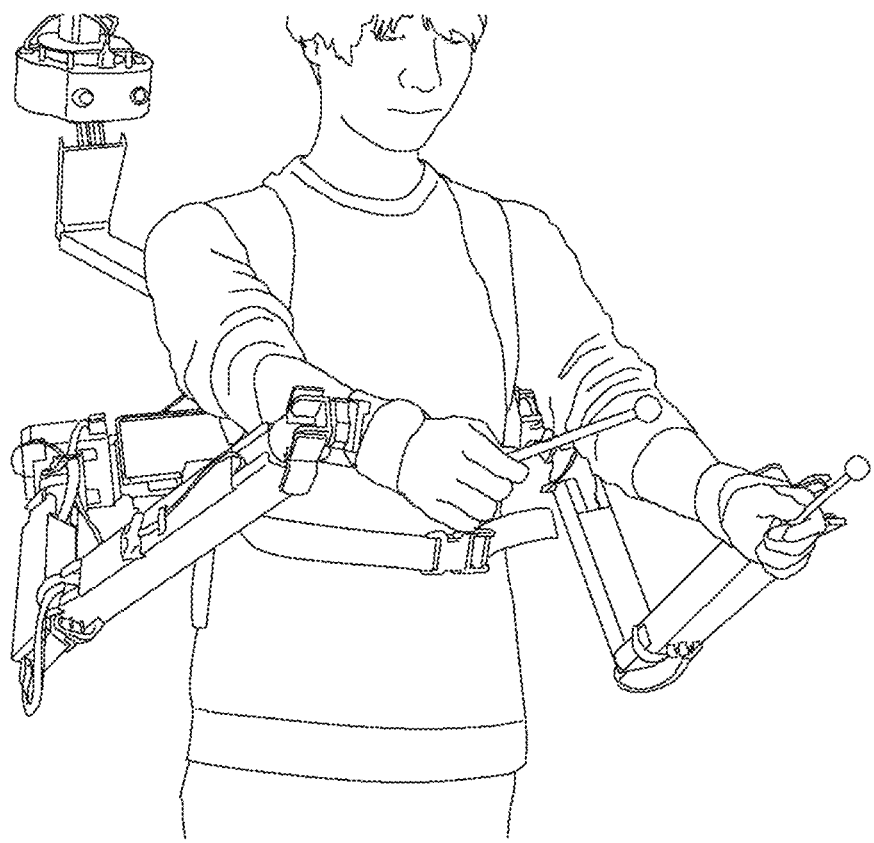
FIG. 10 shows the third type of communication.

FIG. 10 shows the third type of communication. In this type of communication, the robot arm 10 is fitted to the body of the wearer. Further, the total length of the robot arm 10 as extended is larger than the total length of the arm of the wearer. The robot arm 10 is activated in a direction to pull the already-extended arm of the wearer. An example of this type of communication is when the wearer is guided to a place that cannot be reached by the hands of the wearer. We have named this type of communication "Induce".

(Variation)

Described above is an explanation based on an exemplary embodiment. The embodiment is intended to be illustrative only and it will be obvious to those skilled in the art that various modifications to constituting elements and processes could be developed and that such modifications are also within the scope of the present invention.

The imaging apparatus 20 may be a stereo camera provided with two cameras. According to this variation, the manipulator can recognize the image taken by the imaging apparatus 20 stereoscopically and so can share the point of view with the wearer with an advanced sense of vividness.

The rotation mechanism 200 of the imaging apparatus 20 may be controlled by using the head-mounted display 710. In this case, the head-mounted display 710 transmits a signal for controlling the rotation mechanism 200 of the imaging apparatus 20 to the rotation mechanism 200. The transmitted signal is for moving the direction of imaging of the imaging apparatus 20 in coordination with the movement of the head of the manipulator. According to this variation, the manipulator can control the direction of imaging of monitored images as desired according to the movement of the head.

The imaging apparatus 20 may be provided with a movement mechanism for moving the installation position of the imaging apparatus 20. The movement mechanism uses a motor to move the installation position of the imaging apparatus 20 frontward and backward or leftward and rightward relative to the head of the wearer. The remote controller 70 remotely controls the movement mechanism to move the installation position of the imaging apparatus 20. According to this variation, the manipulator can change the installation position of the imaging apparatus 20 as desired and so can obtain more suitable visual information than otherwise.

The imaging apparatus 20 may be provided with a head sensor for sensing the position of the head of the wearer in addition to the aforementioned movement mechanism. In this case, the movement mechanism moves the installation position of the imaging apparatus 20 based on the position of the head of the wearer sensed by the head sensor in such a manner that the imaging apparatus 20 does not come into the wearer's view. According to this variation, the imaging apparatus 20 is moved so as not to come into the wearer's view so that the field of view of the wearer is prevented from being blocked by the imaging apparatus 20.

The remote control system 1 may be provided with an eye tracking apparatus wearable by the wearer. In this case, the rotation mechanism 200 of the imaging apparatus 20 is activated to track the line of sight of the wearer based on a signal from the eye tracking apparatus. In other words, the imaging apparatus 20 changes the direction of imaging automatically in coordination with the point of view of the wearer. According to this variation, the imaging apparatus 20 images a scene exactly as viewed by the wearer so that the manipulator can share the same point of view with the wearer.

The remote control system 1 may be provided with a microphone near the head of the wearer. The sound collected by the microphone is transmitted to the remote controller 70 and monitored by the manipulator. According to this variation, the manipulator can share the auditory perception with the wearer in addition to the point of view.

The remote control system 1 may be provided with a speaker provided near the ear of the wearer or a headphone worn by the wearer in addition to the aforementioned microphone provided near the head of the wearer. In this case, the remote controller 70 is provided with a microphone for collecting the sound originated by the manipulator. The sound originated by the manipulator is collected by the microphone on the side of the wearer and transmitted to the remote controller 70. Conversely, the sound originated by the manipulator is collected by the microphone on the side of the manipulator and transmitted to the speaker or the headphone on the side of the manipulator. According to this variation, the wearer and the manipulator can make a conversation so that they can have audio communication in addition to physical communication.

In the case the robot arm 10 is provided with a fixing component for fixing the robot arm 10 to the body of the wearer, the fixing component may have a shape of a hand. The fingers of the hand-shaped fixing component are fixed to the corresponding fingers of the wearer. The hand-shaped fixing component is provided with a motor at each joint of the fingers, and the joints can be bent or extended independently. According to this variation, the hand-shaped fixing component of the robot arm 10 is fixed in the fingers of the wearer so that the fingers of the wearer can be moved independently and forcibly.

The length of the upper arm part 114 and the forearm part 118 of the robot arm 10 may be independently adjustable. According to this variation, the robot arm 10 can be properly shaped in accordance with the length of the arm of the wearer or the aforementioned type of physical communication.

The robot arm 10 may be provided with a sensor such as a speed sensor, an acceleration sensor, a pressure sensor, and a temperature sensor. These sensors sense the reaction of the wearer to the action of the robot arm 10 and transmits a result of sensing to the remote controller 70. In the case of "Enforce" type of communication, for example, the sensors sense how the wearer has reacted to the robot arm 10 (e.g., "whether the body of the wearer has moved obediently in response to the action of the robot arm 10", "whether the wearer has made a movement against the action of the robot arm 10", "if the wearer has made a movement against the action, how strong the movement was", etc.) and feeds back the result of sensing to the remote controller 70. According to this variation, communication in a direction from the wearer to the manipulator via a feedback, in addition to communication in a direction from the manipulator to the wearer via the robot arm 10, is possible.

A plurality of remote controllers 70 may be provided in place of a single remote controller 70. In this case, different manipulators may manipulate the respective remote controllers 70. According to this variation, many-to-one communication between a plurality of manipulators and the wearer is possible in place of one-to-one communication between the manipulator and the wearer. This is particularly useful when a plurality of teachers (manipulators) work together to teach a skill to one student (wearer).

As described above, in the case of the embodiment in which there are a plurality of remote controllers 70 and different manipulators manipulate the respective remote controllers 70, the remote control system 1 may be controlled to prohibit the manipulation by an manipulator while another manipulator is manipulating the remote controller. Further, in the case of the embodiment in which a microphone and a speaker are provided on the wearer's side and on the manipulator's side and speech communication between the sides is possible, the remote control system 1 may be controlled to prohibit a conversation between a manipulator and the wearer while another manipulator is conversing with the wearer. According to this variation, confusion caused by simultaneous accesses from a plurality of manipulators is avoided in many-to-one communication between a plurality of manipulators and the wearer.

The remote controller 70 may be provided with a robot arm similar to the robot arm 10 on the side of the wearer, in place of the controllers 720a, 720b. In this case, the robot arm 10 on the side of the wearer and the robot arm on the side of the manipulator make the same action synchronously. According to this variation, the wearer and the manipulator can feel as if they share the same action in addition to feeling that they share one body.

The two entities using the remote control system 1 may be on an equal basis in place of one being the manipulator and the other being the wearer. In this case, each of the two users wears the robot arm and the imaging apparatus and manipulates the remote controller. According to this variation, the two users can be in physical communication on an equal basis, while also feeling as if they share the body.

The entity manipulating the remote controller 70 may be a program-based computer in place of a human being (manipulator). Alternatively, the manipulating entity may be an artificial intelligence realized by machine learning, deep learning, etc. Accordingly, the flexibility of the manipulating entity is improved.

What is claimed is:

1. A remote control system comprising a robot arm, an imaging apparatus, a base part, and a remote controller for remotely controlling the robot arm, wherein
   the robot arm is fitted to the base part,
   the imaging apparatus is fitted to the base part and provided near a head of a wearer,
   the base part is fitted to a upper half of a body of the wearer, the upper half of the body being exemplified by a back,
   the robot arm and the imaging apparatus are communicably connected to the remote controller,
   the remote controller is configured to display an image received from the imaging apparatus and transmit a control signal to control the robot arm, and
   a length of each of an upper arm part and a forearm part of the robot arm is larger than a length of each of an upper arm and a forearm of the wearer, and the robot arm is configured to pull an already-extended arm of the wearer.

2. The remote control system according to claim 1, wherein
   the robot arm is provided with a removable hand part.

3. The remote control system according to claim 1, wherein
   the robot arm is provided with a fixing component for fixing the robot arm to an arm of the wearer.

4. The remote control system according to claim 1, wherein
   the imaging apparatus is provided with a rotation mechanism for changing a direction of imaging,
   the imaging apparatus is communicably connected to the remote controller, and
   the remote controller remotely controls the rotation mechanism.

5. The remote control system according to claim 1, wherein
   the remote controller is provided with a recorder that records the control signal.

6. The remote control system according to claim 5, wherein
   the remote controller transmits the control signal recorded in the recorder.

7. The remote control system according to claim 1, wherein
- the remote controller is further provided with a machine learning unit, and
- the machine learning unit outputs a new control signal by receiving the image and the control signal and performing machine learning accordingly.

8. The remote control system according to claim 7, wherein
- the remote controller transmits the control signal output by the machine learning unit based on the image.

9. The remote control system according to claim 1, comprising:
- a plurality of robot arms, an equal number of imaging apparatuses, and an equal number of base partts, wherein
- the remote controller transmits the same control signal to all robot arms at the same time.

10. The remote control system according to claim 1, comprising:
- a plurality of remote controllers, wherein
- each of the plurality of remote controllers is provided with an interruption unit configured to transmit a control signal by interrupting while another remote controller is transmitting a control signal.

11. The remote control system according to claim 1, comprising:
- a plurality of remote controllers, wherein
- the robot arm is controlled by a signal derived from averaging control signals output from the plurality of remote controllers.

* * * * *